(12) United States Patent
Han

(10) Patent No.: US 11,986,138 B2
(45) Date of Patent: May 21, 2024

(54) ROBOT CLEANER AND METHOD FOR CONTROLLING SAME

(71) Applicant: LG ELECTRONICS INC., Seoul (KR)

(72) Inventor: Jinwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 420 days.

(21) Appl. No.: 17/299,940

(22) PCT Filed: Dec. 10, 2019

(86) PCT No.: PCT/KR2019/017351
§ 371 (c)(1),
(2) Date: Jun. 4, 2021

(87) PCT Pub. No.: WO2020/122541
PCT Pub. Date: Jun. 18, 2020

(65) Prior Publication Data
US 2022/0047142 A1 Feb. 17, 2022

(30) Foreign Application Priority Data
Dec. 12, 2018 (KR) .......................... 10-2018-0160308

(51) Int. Cl.
*A47L 9/28* (2006.01)
*A47L 9/00* (2006.01)
*A47L 11/40* (2006.01)

(52) U.S. Cl.
CPC ........... *A47L 11/4011* (2013.01); *A47L 9/009* (2013.01); *A47L 9/2842* (2013.01); *A47L 9/2852* (2013.01); *A47L 2201/04* (2013.01)

(58) Field of Classification Search
CPC .... A47L 9/009; A47L 9/2852; A47L 11/4011; A47L 2201/04
See application file for complete search history.

(56) References Cited

U.S. PATENT DOCUMENTS

2006/0237037 A1* 10/2006 Kim .................... G05D 1/0219
134/21
2010/0288307 A1* 11/2010 Chung ................ G05D 1/0255
134/18

(Continued)

FOREIGN PATENT DOCUMENTS

| CN | 108742346 | 11/2018 |
| JP | 2018-061529 | 4/2018 |

(Continued)

OTHER PUBLICATIONS

International Search Report dated Mar. 27, 2020 issued in Application No. PCT/KR2019/017351.

(Continued)

*Primary Examiner* — Dale Moyer
(74) *Attorney, Agent, or Firm* — KED & ASSOCIATES, LLP

(57) ABSTRACT

A robot cleaner according to an embodiment of the present invention comprises: a body including a suction motor for generating a suction force; a traveling part for moving the body; and a control part for, in response to sensing of a preconfigured input signal, recognizing a position of the body in a cleaning area and determining a start position on the basis of the recognized position. The control part sets an imaginary boundary having a predetermined size with reference to the determined start position, and when a travel route having a preconfigured pattern is set in the boundary, controls the travelling part and the suction motor to perform a cleaning operation while travelling along the travel route in a first direction and then perform a cleaning operation while travelling along the travel route in a second direction opposite to the first direction.

12 Claims, 13 Drawing Sheets

(56) References Cited

U.S. PATENT DOCUMENTS

| | | | |
|---|---|---|---|
| 2011/0202175 A1 | 8/2011 | Romanov et al. | |
| 2013/0206177 A1* | 8/2013 | Burlutskiy | A47L 9/2826 |
| | | | 15/319 |
| 2013/0326839 A1* | 12/2013 | Cho | G05D 1/0246 |
| | | | 701/2 |
| 2016/0297072 A1* | 10/2016 | Williams | B25J 9/1666 |

FOREIGN PATENT DOCUMENTS

| | | |
|---|---|---|
| KR | 10-2005-0111138 | 11/2005 |
| KR | 10-0638219 | 10/2006 |
| KR | 10-2010-0123035 | 11/2010 |
| KR | 10-2011-0026414 | 3/2011 |
| KR | 10-2013-0091879 | 8/2013 |
| KR | 10-2013-0137995 | 12/2013 |
| KR | 10-2014-0115891 | 10/2014 |

OTHER PUBLICATIONS

Korean Notice of Allowance dated Feb. 26, 2020 issued in Application No. 10-2018-0160308.
Korean Office Action dated Aug. 30, 2019 issued in Application No. 10-2018-0160308.

* cited by examiner

[END CLEANING]

ROBOT CLEANER AND METHOD FOR CONTROLLING SAME

CROSS-REFERENCE TO RELATED PATENT APPLICATIONS

This application is a U.S. National Stage Application under 35 U.S.C. § 371 of PCT Application No. PCT/KR2019/017351, filed Dec. 10, 2019, which claims priority to Korean Patent Application No. 10-2018-0160308, filed Dec. 12, 2018, whose entire disclosures are hereby incorporated by reference.

BACKGROUND

1. Technical Field

The present disclosure relates to a robot cleaner capable of performing cleaning while driving autonomously, and a control method thereof.

2. Description of the Related Art

A cleaner is a device that performs cleaning by sucking or mopping dust or foreign materials. In general, the cleaner performs a cleaning function for a floor, and includes wheels for movement. In general, the wheels are rolled by external force applied to the cleaner main body to move the cleaner main body relative to the floor.

However, in recent years, researches on an autonomous cleaner such as a robot cleaner that performs cleaning while driving on its own without a user's manipulation, and a cleaner that moves on its own along a nozzle moved by a user's manipulation have been actively carried out.

With the development of such a robot cleaner performing cleaning while driving by itself without a user's operation, there is a need to develop a plurality of robot cleaners for performing cleaning while any one thereof follows another one thereof or while collaborating with each other without a user's operation.

This robot cleaner initially performs cleaning while searching and moving all unknown areas. Then, afterwards, learning cleaning is performed based on a map generated based on the search.

However, even in the case of learning cleaning, it is designed to clean all the areas by considering the coverage of the entire cleaning area as important. On the other hand, when the user wants to clean only a partial area, it takes a lot of time and increases battery consumption when he or she cleans an entire house as before. Alternatively, it causes inconvenience that the user must intentionally end the cleaning after the robot cleaner cleans a partial area.

SUMMARY

Accordingly, an aspect of the present disclosure is to provide a robot cleaner capable of intensively cleaning a partial area, which is not an entire cleaning area on a map, and a control method thereof.

Another aspect of the present disclosure is to provide a robot cleaner capable of ending an operation by itself after intensively cleaning a partial area, and a control method thereof.

Furthermore, still another aspect of the present disclosure is to provide a robot cleaner capable of slowly driving in a desired partial area with high suction power, and driving repeatedly, so as to further improve cleaning performance, and a control method thereof.

In addition, yet still another aspect of the present disclosure is to provide a robot cleaner capable of performing an obstacle avoidance operation in consideration of intensive cleaning performance when an obstacle is sensed while driving and cleaning a desired partial area, and a control method thereof.

A robot cleaner according to an embodiment of the present disclosure may include a main body provided with a suction motor that generates suction power; a driving unit that moves the main body; and a controller that recognizes a position of the main body in a cleaning area in response to sensing a preset input signal, and determining a start position based on the recognized position, wherein the controller sets a virtual boundary having a fixed size based on the determined start position, and sets a driving path having a preset pattern within the boundary, and controls the driving unit and the suction motor to perform a cleaning operation while driving on the driving path in a first direction and then to perform a cleaning operation while driving on the driving path in a second direction opposite to the first direction.

Furthermore, in an embodiment, the controller may end a cleaning operation when the main body drives on the driving path in the second direction to reach the start position.

Furthermore, in an embodiment, the controller may control the driving unit to end a cleaning mode of the main body that is currently being performed in response to sensing the preset signal while performing the cleaning operation and to move the main body based on the set driving path.

Furthermore, in an embodiment, the controller may designate an inner area of the boundary as a cleaning area, and control the driving unit so as not to exit the boundary while the main body moves in the inner area.

Furthermore, in an embodiment, driving in the first direction may be a square spiral driving in which the main body gradually moves away from the start position, and driving in the second direction may be a square spiral driving in which the main body gradually moves closer to the start position.

Furthermore, in an embodiment, the controller may control the driving unit to change the direction by rotating in place in a direction facing the start position after the main body completes the driving of the driving path in the first direction.

Furthermore, in an embodiment, the controller may control the suction motor to increase the suction power than before when the preset input signal is sensed.

Furthermore, in an embodiment, the controller may control the suction motor to generate first suction power while the main body drives on the driving path in the first direction, and generate second suction power different from the first suction power while the main body drives on the driving path in the second direction.

Furthermore, in an embodiment, the robot cleaner may further include a sensor that senses an obstacle existing in front of the main body, wherein the controller controls the driving unit to move the main body by avoiding the obstacle in a direction toward the start position in response to sensing the obstacle through the sensor while the main body drives on the driving path in the first direction or the second direction.

Furthermore, in an embodiment, when it is determined that the main body is unable to move by avoiding the sensed obstacle, the controller may end a cleaning operation after driving around the sensed obstacle in a predetermined pattern.

Furthermore, in an embodiment, when the start position is set to a position spaced apart from the main body, the controller may acquire distance information from the recognized position to the start position, and control the driving unit to move the main body to the start position based on the acquired distance information.

Furthermore, in an embodiment, when the virtual boundary is set to less than a fixed size, the controller may set a first point adjacent to the boundary as the start position, and the main body may perform a cleaning operation while skipping driving in the first direction and driving only in the second direction in response to moving the main body to the first point.

Furthermore, in an embodiment, the controller may perform a cleaning operation in a square spiral driving gradually closer to the recognized position from the first point in response to moving the main body to the first point, and end the cleaning operation when the main body reaches the recognized position.

In addition, there is provided a method of controlling a robot cleaner, the method may include sensing a preset input signal; determining a start position based on a current position of a main body in response to the preset input signal; setting a virtual boundary having a fixed size based on the determined start position and setting a driving path having a preset pattern within the boundary; and performing a cleaning operation while driving on the driving path in a first direction and then performing a cleaning operation while driving on the driving path in a second direction opposite to the first direction.

Furthermore, in an embodiment, the method may further include ending a cleaning operation when the main body drives on the driving path in the second direction to reach the start position.

Furthermore, in an embodiment, the method may further include allowing the main body to drive by avoiding an obstacle in a direction toward the start position when the obstacle is sensed while the main body drives on the driving path in the first direction or the second direction.

As described above, according to a robot cleaner and a control method thereof in accordance with an embodiment of the present disclosure, it may be possible to reduce a driving speed and increase suction power, thereby intensively and quickly cleaning a partial area, which is not an entire cleaning area on a map. Furthermore, even though a user does not intentionally end intensive cleaning, cleaning may be automatically ended after intensively cleaning in a predetermined area, thereby providing user convenience. In addition, an avoidance operation against an obstacle sensed during intensive cleaning may move toward an inside of an intensive cleaning area, thereby improving intensive cleaning performance.

DETAILED DESCRIPTION OF THE EMBODIMENTS

Hereinafter, a robot cleaner associated with the present disclosure will be described in detail with reference to the accompanying drawings.

Hereinafter, description will be given in detail of embodiments disclosed herein. Technical terms used in this specification are merely used for explaining specific embodiments, and should not be constructed to limit the scope of the technology disclosed herein.

Figure 1:
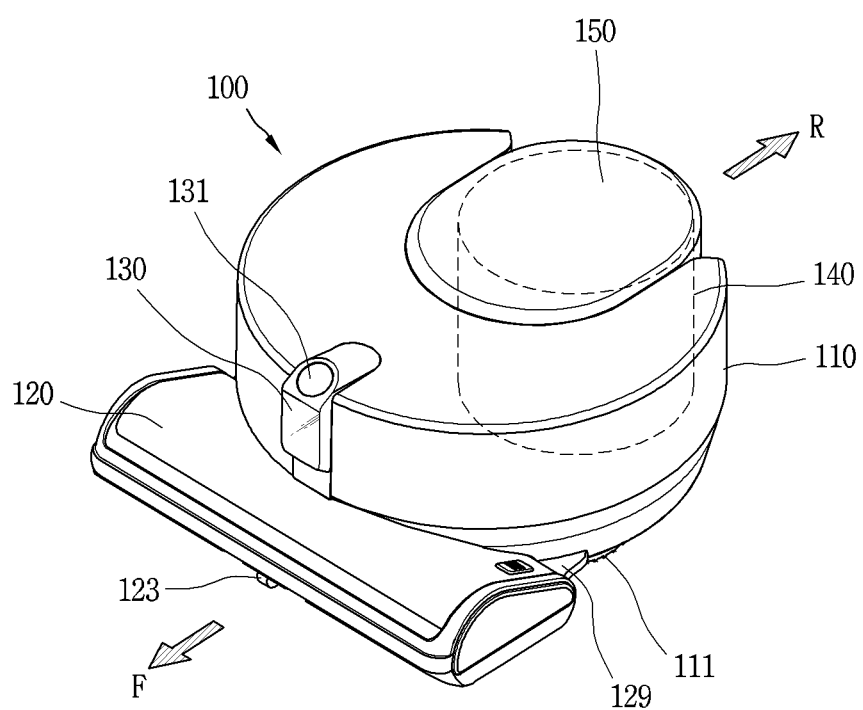
FIG. 1 is a perspective view showing an example of a robot cleaner according to the present disclosure.
Figure 2:
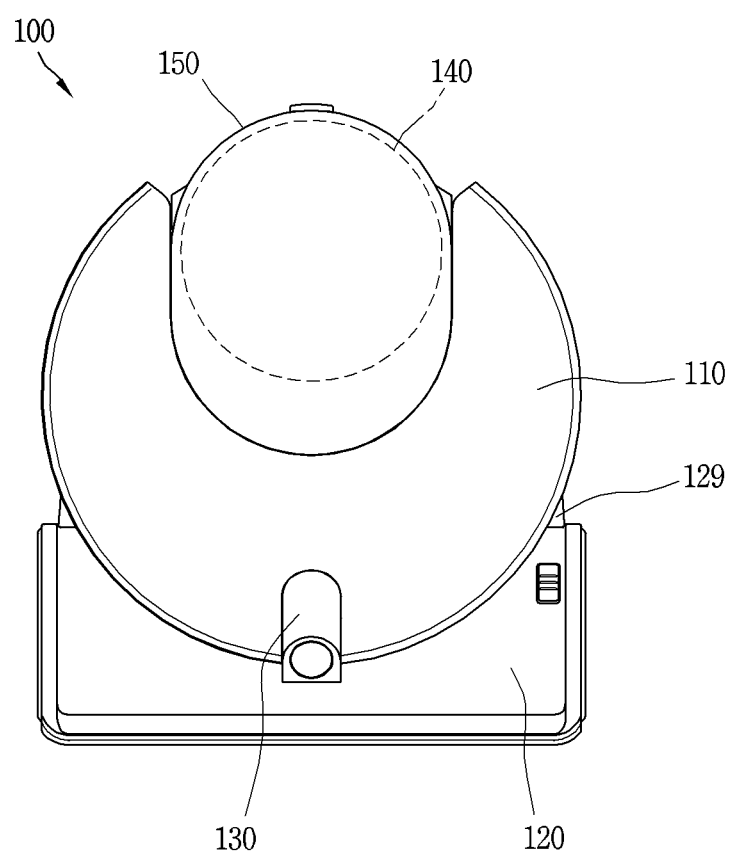
FIG. 2 is a plan view of the robot cleaner illustrated in FIG. 1.
Figure 3:
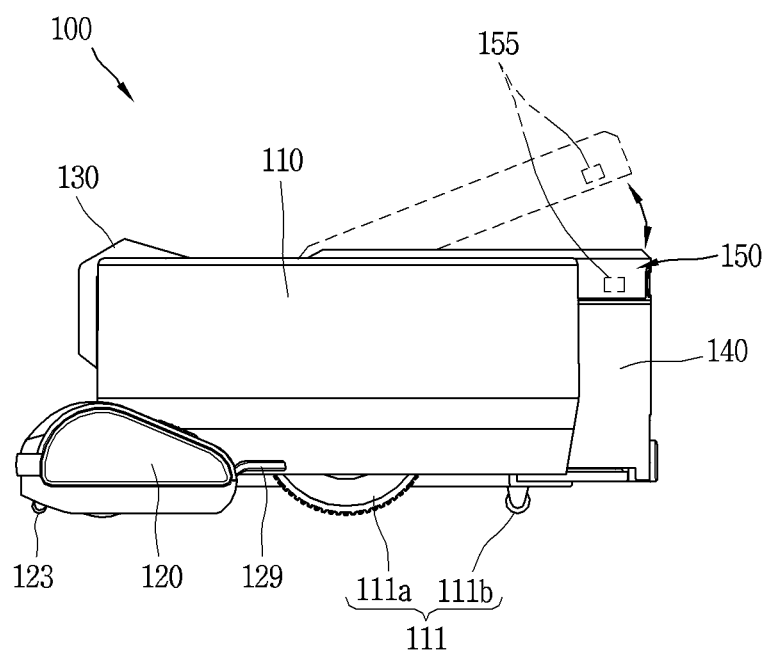
FIG. 3 is a side view of the robot cleaner illustrated in FIG. 1.

FIG. 1 is a perspective view illustrating an example of a robot cleaner 100 according to the present disclosure, FIG. 2 is a plan view of the robot cleaner 100 illustrated in FIG. 1, and FIG. 3 is a side view of the robot cleaner 100 illustrated in FIG.

In this specification, a mobile robot, a robot cleaner, and a cleaner that performs autonomous driving may be used in the same sense. In this specification, a plurality of autonomous cleaners may include at least part of configurations illustrated in FIGS. 1 to 3.

Referring to FIGS. 1 through 3, the robot cleaner 100 performs a function of cleaning a floor while driving on a predetermined area by itself. Cleaning of a floor mentioned here includes sucking dust (including foreign matter) on the floor or mopping the floor.

The robot cleaner 100 may include a cleaner main body 110, a cleaning unit 120, a sensing unit 130, and a dust container 140.

The cleaner main body 110 is provided with various components in addition to a controller (not illustrated) for controlling the robot cleaner 100. In addition, the cleaner main body 110 is provided with a wheel unit 111 for the driving of the robot cleaner 100. The robot cleaner 100 may move forward, backward, leftward and rightward by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the controller. Each of the main wheels 111a may be configured to be drivable independently from each other. For example, each main wheel 111a may be driven by a different motor. Or each main wheel 111a may be driven by a plurality of different axes provided in one motor.

The sub wheel 111b is configured to support the cleaner body 110 along with the main wheel 111a and assist the driving of the robot cleaner 100 by the main wheel 111a. The sub wheel 111b may also be provided on a cleaning unit 120 to be described later.

The controller is configured to control the driving of the wheel unit 111 in such a manner that the robot cleaner 100 autonomously drives on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

In FIG. 1, a cleaning unit 120 may be disposed in a protruding form from one side of the cleaner main body 110, so as to suck air containing dust or mop an area. The one side may be a side where the cleaner main body 110 travels in a forward direction F, that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The vacant space is a space between both left and right end portions of the cleaner body 110 and both left and right end portions of the cleaning unit 120, and has a shape recessed in an inward direction of the robot cleaner 100.

When an obstacle is caught in the vacant space, the robot cleaner 100 may be blocked by an obstacle not to move. In order to prevent this, a cover member 129 may be disposed to cover at least part of the vacant space.

The cover member 129 may be provided on the cleaner main body 110 or the cleaning unit 120. According to the present embodiment, it is shown that the cover member 129 is formed in a protruding manner on both sides of a rear end portion of the cleaning unit 120, and disposed to cover an outer peripheral surface of the cleaner body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. In other words, as the cover member 129 is disposed to cover an outer circumferential surface of the cleaner main body 110 to determine a relative position of the cleaning unit 120 with respect to the cleaner main body 110.

The cleaning unit 120 may be provided with a castor 123. The castor 123 is configured to assist the driving of the robot cleaner 100, and also support the robot cleaner 100.

The cleaner main body 110 is provided with the sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 to sense an obstacle or geographic feature in front of the robot cleaner 100 so that the cleaning unit 120 positioned at the forefront of the robot cleaner 100 does not collide with the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the controller. For example, the camera 131 may transmit an electrical signal corresponding to an upward image to the controller. The electrical signal corresponding to the upward image may be used by the controller to detect the position of the cleaner main body 110.

In addition, the sensing unit 130 may detect obstacles such as walls, furniture, and cliffs on a driving surface or a driving path of the robot cleaner 100. Also, the sensing unit 130 may sense presence of a docking device that performs battery charging. Also, the sensing unit 130 may sense ceiling information so as to map a driving area or a cleaning area of the robot cleaner 100.

The cleaner main body 110 is provided with a dust container 140 detachably coupled thereto for separating and collecting dust from sucked air.

The dust container 140 is provided with a dust container cover 150 which covers the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. Dust is collected in the dust box 140, and air is discharged from the dust box 140 and then discharged to the outside through the discharge port 112 in the cleaner body 110 and finally through the discharge port 112.

An embodiment related to the components of the robot cleaner 100 will be described below with reference to FIG. 4.

The robot cleaner 100 or the mobile robot according to an embodiment of the present disclosure may include a communication unit 1100, an input unit 1200, a driving unit 1300, a sensing unit 1400, an output unit 1500, a power supply unit 1600, a memory 1700, a controller 1800, and a cleaning unit 1900, or a combination thereof.

Figure 4:
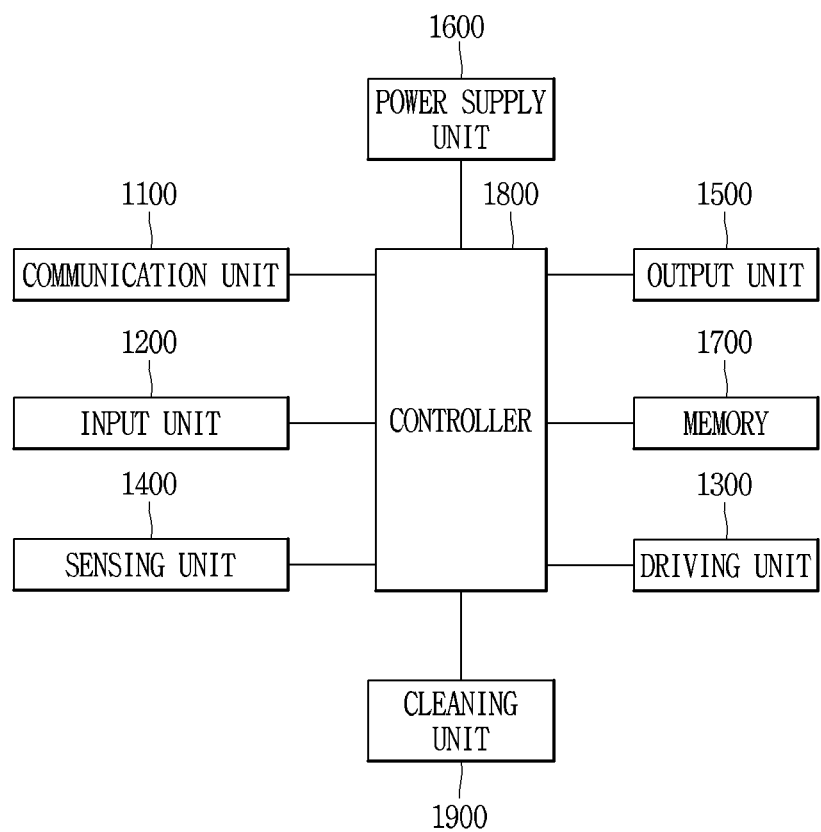
FIG. 4 is a block diagram showing exemplary components of a robot cleaner according to an embodiment of the present disclosure.

Here, it is needless to say that the components shown in FIG. 4 are not essential, and thus a robot cleaner having more or fewer components than shown in FIG. 4 may be implemented. Also, as described above, each of a plurality of robot cleaners described in the present disclosure may equally include only some of components to be described below. In other words, a plurality of robot cleaners may include different components.

Hereinafter, each component will be described.

First, the power supply unit 1600 includes a battery that can be charged by an external commercial power supply, and supplies power to the mobile robot. The power supply unit 1600 supplies driving power to each of the components included in the mobile robot to supply operating power required for the mobile robot to drive or perform a specific function.

Here, the controller 1800 may sense the remaining power of the battery, and control the battery 1800 to move power to a charging base connected to the external commercial power source when the remaining power is insufficient, and thus a charge current may be supplied from the charging base to charge the battery. The battery may be connected to a battery sensing unit, and a battery remaining amount and a charging state may be delivered to the controller 1800. The output unit 1500 may display the remaining battery level under the control of the controller.

The battery may be located in a lower portion of the center of the robot cleaner or may be located at either one of the left and right sides. In the latter case, the mobile robot may further include a balance weight for eliminating a weight bias of the battery.

The controller 1800 performs a role of processing information based on an artificial intelligence technology and may include at least one module for performing at least one of learning of information, inference of information, perception of information, and processing of a natural language.

The controller 1800 may use a machine learning technology to perform at least one of learning, inference and processing of a large amount of information (big data), such as information stored in the cleaner, environment information around the cleaner, information stored in a communicable external storage, and the like. Furthermore, the controller 1800 may predict (or infer) at least one executable operation of the cleaner based on information learned using the machine learning technology, and control the cleaner to execute the most feasible operation among the at least one predicted operation.

The machine learning technology is a technology that collects and learns a large amount of information based on at least one algorithm, and determines and predicts information based on the learned information. The learning of information is an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using a deep neural network (DNN) algorithm. The deep neural network (DNN) may have a structure of linking layers and transferring data between the layers. This deep learning technology may be employed to learn a vast amount of information through the deep neural network (DNN) using a graphic processing unit (GPU) optimized for parallel computing.

The controller 1800 may use training data stored in an external server or a memory, and may include a learning engine for detecting a characteristic for recognizing a predetermined object. Here, characteristics for recognizing an object may include the size, shape, and shade of the object.

Specifically, when the controller 1800 inputs a part of images acquired through the camera provided on the cleaner into the learning engine, the learning engine may recognize at least one object or organism included in the input images.

When the learning engine is applied to driving of the cleaner, the controller 1800 can recognize whether or not an obstacle such as a chair leg, a fan, and a specific shape of balcony gap, which obstruct the running of the cleaner, exists around the cleaner. This may result in enhancing efficiency and reliability of the driving of the cleaner.

On the other hand, the learning engine may be mounted on the controller 1800 or on an external server. When the learning engine is mounted on an external server, the controller 1800 may control the communication unit 1100 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the driving unit 1300 may be provided with a motor to drive the motor, thereby rotating the left and right main wheels in both directions to rotate or move the main body. At this time, the left and right main wheels may be independently moved. The driving unit 1300 may allow the main body of the mobile robot to move forward, backward, left, right, curvedly, or rotate in place.

Meanwhile, the input unit 1200 receives various control commands for the robot cleaner from the user. The input unit 1200 may include one or more buttons, for example, the input unit 1200 may include an OK button, a set button, and the like. The OK button is a button for receiving a command for confirming sensing information, obstacle information, position information, and map information from the user, and the set button is a button for receiving a command for setting the information from the user.

In addition, the input unit 1200 may include an input reset button for canceling a previous user input and receiving a user input again, a delete button for deleting a preset user input, a button for setting or changing an operation mode, a button for receiving a command to be returned to the charging base, and the like.

Furthermore, the input unit 1200, such as a hard key, a soft key, a touch pad, or the like, may be installed on a upper portion of the mobile robot. In addition, the input unit 1200 may have a form of a touch screen along with the output unit 1500.

On the other hand, the output unit 1500 may be installed on an upper portion of the mobile robot. Of course, the installation location and installation type may vary. For example, the output unit 1500 may display a battery state, a driving mode, and the like on the screen.

In addition, the output unit 1500 may output state information inside the mobile robot detected by the sensing unit 1400, for example, a current state of each configuration included in the mobile robot. Moreover, the output unit 1500 may display external state information, obstacle information, position information, map information, and the like detected by the sensing unit 1400 on the screen. The output unit 1500 may be formed with any one of a light emitting diode (LED), a liquid crystal display (LCD), a plasma display panel, and an organic light emitting diode (OLED).

The output unit 1500 may further include a sound output device for audibly outputting an operation process or an operation result of the mobile robot performed by the controller 1800. For example, the output unit 1500 may output a warning sound to the outside in accordance with a warning signal generated by the controller 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure may output environment information on a driving area on the screen or output it as sound. According to another embodiment, the mobile robot may transmit map information or environment information to a terminal device through the communication unit 1100 to output a screen or sound to be output through the output unit 1500.

The memory 1700 stores a control program for controlling or driving the robot cleaner and the resultant data. The memory 1700 may store audio information, image information, obstacle information, position information, map information, and the like. Furthermore, the memory 1700 may store information related to a driving pattern.

The memory 1700 mainly uses a nonvolatile memory. Here, the non-volatile memory (NVM, NVRAM) is a storage device capable of continuously storing information even when power is not supplied thereto, and for an example, the non-volatile memory may be a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an external signal detection sensor, a front detection sensor, a cliff detection sensor, a two-dimensional camera sensor, and a three-dimensional camera sensor.

The external signal detection sensor may sense an external signal of the mobile robot. The external signal detection sensor may be, for example, an infrared ray sensor, an ultrasonic sensor, an radio frequency (RF) sensor, or the like.

The mobile robot may receive a guide signal generated by the charging base using the external signal detection sensor to check the position and direction of the charging base. At this time, the charging base may transmit a guide signal indicating the direction and the distance to allow the mobile robot to return. In other words, the mobile robot may receive a signal transmitted from the charging base to determine a current position, set a moving direction, and return to the charging base.

On the other hand, the front detection sensor may be installed at predetermined intervals at a front side of the mobile robot, specifically along a lateral outer circumferential surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the controller 1800. In other words, the front sensor may detect protrusions on the moving path of the mobile robot, household appliances, furniture, walls, wall corners, and the like, and transmit the information to the controller 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may include a transmitter and a receiver, and the controller 1800 may determine whether or not there exists an obstacle based on whether or not ultrasonic waves radiated through the transmitter is reflected by the obstacle or the like and received at the receiver, and calculate a distance to the obstacle using the ultrasonic emission time and ultrasonic reception time.

Furthermore, the controller 1800 may compare ultrasonic waves emitted from the transmitter and ultrasonic waves received at the receiver to detect information related to a size of the obstacle. For example, the controller 1800 may determine that the larger the obstacle is, the more ultrasonic waves are received at the receiver.

In one embodiment, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

In other words, the transmitters may be spaced apart from the front center of the main body to the left and right sides, and one or two (or more) transmitters may be disposed between the receivers to form a receiving area of ultrasonic signals reflected from an obstacle or the like. With this arrangement, the receiving area may be expanded while reducing the number of sensors. A transmission angle of ultrasonic waves may maintain a range of angles that do not affect different signals to prevent a crosstalk phenomenon. Furthermore, the receiving sensitivities of the receivers may be set to be different from each other.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front detection sensor may include an infrared sensor as a different type of sensor other than the ultrasonic sensor.

The infrared sensor may be installed on an outer circumferential surface of the mobile robot together with the ultrasonic sensor. The infrared sensor may also sense an obstacle existing at the front or the side to transmit obstacle information to the controller 1800. In other words, the infrared sensor may sense a protrusion on the moving path of the mobile robot, a household appliance, a furniture, a wall, a wall corner, and the like, and transmit the information to the controller 1800. Therefore, the mobile robot may move within a specific area without collision with the obstacle.

On the other hand, a cliff detection sensor (or cliff sensor) may sense an obstacle on the floor supporting the main body of the mobile robot mainly using various types of optical sensors.

In other words, the cliff detection sensor may be installed on a rear surface of the bottom mobile robot, but may of course be installed in a different position depending on the type of the mobile robot. The cliff detection sensor is a sensor located on a back surface of the mobile robot to sense an obstacle on the floor, and the cliff detection sensor may be an infrared sensor, an ultrasonic sensor, an RF sensor, a PSD (Position Sensitive Detector) sensor, or the like, which is provided with a transmitter and a receiver such as the obstacle detection sensor.

For an example, any one of the cliff detection sensors may be installed in front of the mobile robot, and the other two cliff detection sensors may be installed relatively behind.

For example, the cliff detection sensor may be a PSD sensor, but may also be configured with a plurality of different kinds of sensors.

The PSD sensor detects a short and long distance position of incident light with one p-n junction using a semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. In other words, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is sensed using the PSD sensor, a stable measurement value may be obtained irrespective of the reflectance and the color difference of the obstacle.

The cleaning unit 1900 cleans a designated cleaning area according to a control command transmitted from the controller 1800. The cleaning unit 1900 scatters dust in the vicinity through a brush (not shown) that scatters dust in a designated cleaning area, and then drives the suction fan and the suction motor to suck the scattered dust. In addition, the cleaning unit 1900 may perform mopping in a designated cleaning area according to the replacement of the configuration.

Furthermore, the controller 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the controller 1800 may determine whether to pass a cliff or not according to a ground state of the detected cliff by using the cliff detection sensor, and decide whether to pass the cliff or not according to the determination result. For example, the controller 1800 determines presence or non-presence of a cliff and a depth of the cliff through the cliff sensor, and then allows the mobile robot to pass through the cliff only when a reflection signal is detected through the cliff sensor.

As another example, the controller 1800 may also determine lifting of the mobile robot using the cliff sensor.

On the other hand, the two-dimensional camera sensor is provided on one side of the mobile robot to acquire image information related to the surroundings of the main body during movement.

An optical flow sensor converts a downward image input from an image sensor provided in the sensor to generate image data in a predetermined format. The generated image data may be stored in the memory 1700.

Furthermore, one or more light sources may be installed adjacent to the optical flow sensor. The one or more light sources irradiate light to a predetermined area of the bottom surface captured by the image sensor. In other words, when the mobile robot moves in a specific area along the bottom surface, a predetermined distance is maintained between the image sensor and the bottom surface when the bottom surface is flat. On the other hand, when the mobile robot moves on a bottom surface having a nonuniform surface, the robot moves away from the bottom surface by more than a predetermined distance due to the irregularities of the bottom surface and obstacles. At this time, the one or more light sources may be controlled by the controller 1800 to adjust an amount of light to be irradiated. The light source may be a light emitting device capable of controlling the amount of light, for example, a light emitting diode (LED) or the like.

Using the optical flow sensor, the controller 1800 may detect a position of the mobile robot irrespective of the slip of the mobile robot. The controller 1800 may compare and analyze the image data captured by the optical flow sensor over time to calculate the moving distance and the moving direction, and calculate the position of the mobile robot on the basis of the moving distance and the moving direction. Using image information on a bottom side of the mobile robot using the optical flow sensor, the controller 1800 may perform slip-resistant correction on the position of the mobile robot calculated by another device.

The three-dimensional camera sensor may be attached to one side or a part of the main body of the mobile robot to generate three-dimensional coordinate information related to the surroundings of the main body.

In other words, the three-dimensional camera sensor may be a 3D depth camera that calculates a near and far distance of the mobile robot and an object to be captured.

Specifically, the three-dimensional camera sensor may capture a two-dimensional image related to the surroundings of the main body, and generate a plurality of three-dimensional coordinate information corresponding to the captured two-dimensional image.

In one embodiment, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of an area where light of the first pattern and light of the second pattern are incident.

In another embodiment, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the three-dimensional camera sensor may include first and second lasers, wherein the first laser irradiates a linear shaped laser intersecting each other, and the second laser irradiates a single linear shaped laser. According to this, the lowermost laser is used to sense obstacles in the bottom portion, the uppermost laser is used to sense obstacles in the upper portion, and the intermediate laser between the lowermost laser and the uppermost laser is used to sense obstacles in the middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like. The another device may also be a device for controlling a door, a window, a water supply valve, a gas valve, or the like. The another device may be a sensor for sensing temperature, humidity, air pressure, gas, or the like.

Further, the communication unit 1100 may communicate with another robot cleaner 100 located in a specific area or within a predetermined range.

Meanwhile, in the case of a robot cleaner that performs a cleaning operation based on a map, the cleaning period of time takes long since the cleaning operation is generally performed until the entire cleaning area corresponding to the map is covered.

Accordingly, in the present disclosure, a driving method of allowing a robot cleaner to intensively clean a predetermined area is proposed, thereby implementing the robot cleaner capable of increasing cleaning efficiency and saving cleaning time.

Specifically, a robot cleaner 100 according to the present disclosure includes a suction motor that generates suction power, a driving unit 1300 that moves moving the main body, and a controller 1800 that controls the driving/operation of the suction motor and the driving unit 1300.

Furthermore, the controller 1800 may recognize a position of a robot cleaner body within a cleaning area in response to sensing a preset input signal. In addition, the controller 1800 may determine a start position based on the recognized position of the robot cleaner. Here, the start position may denote a cleaning start position in a predetermined area to be intensively cleaned by the robot cleaner.

Furthermore, the controller 1800 may set a virtual boundary having a fixed size based on the determined start position, and set a driving path having a preset pattern within the boundary. Here, the virtual boundary may denote a rectangular edge extending around the start position or including the start position at an arbitrary point. In addition, the preset pattern may be, for example, a spiral pattern.

When the driving path having a preset pattern is set as described above, the robot cleaner 100 performs a cleaning operation while driving in a first direction on the set driving path. When the cleaning operation in the first direction is completed, the robot cleaner 100 performs the cleaning operation while driving in a second direction facing (opposite to) the first direction on the set driving path at this time. Accordingly, it may be possible to intensively clean a predetermined area within a short period of time.

Hereinafter, a method of intensively cleaning a predetermined area by the robot cleaner 100 according to an embodiment of the present disclosure will be described in more detail with reference to FIG. 5.

Figure 5:
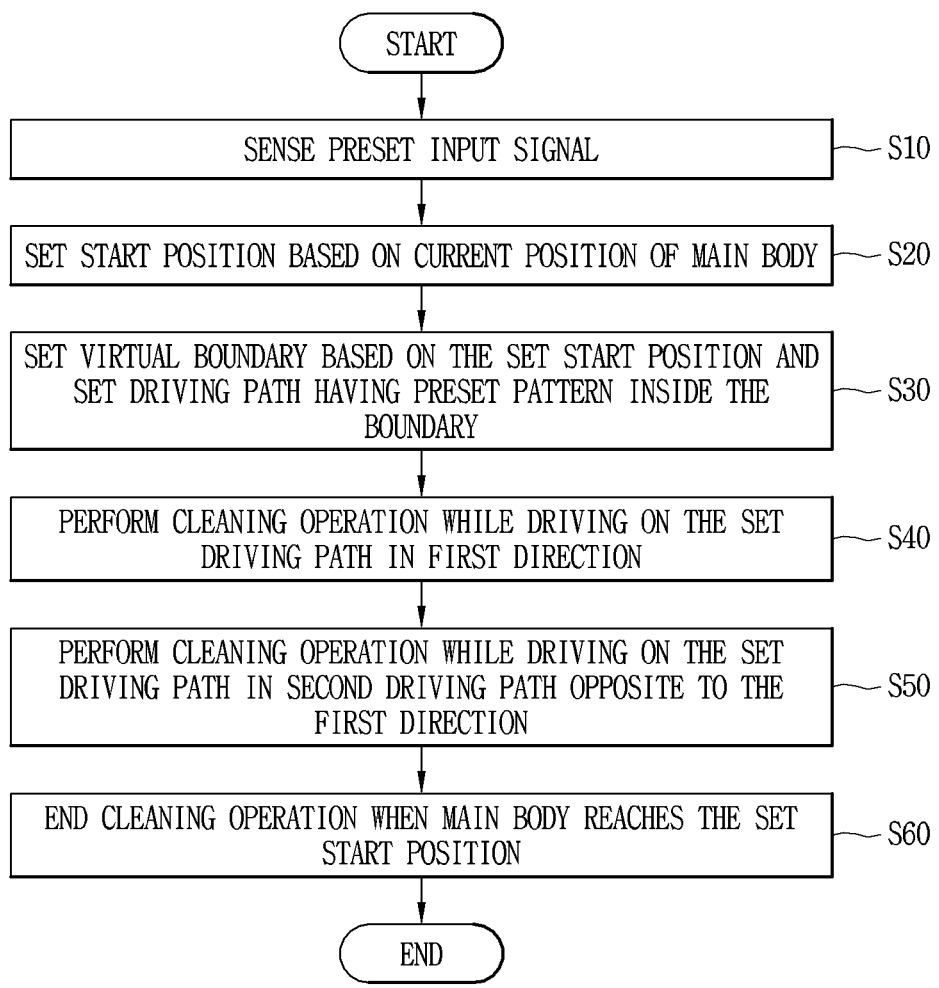
FIG. 5 is a flowchart for explaining a method of intensively cleaning a predetermined area by a robot cleaner according to an embodiment of the present disclosure.

Referring to FIG. 5, first, a process of sensing a preset input signal by the robot cleaner 100 is performed (S10).

Here, the "preset input signal" denotes a start signal (or trigger signal) of an operation mode for intensively cleaning a predetermined area. The preset input signal may be generated through a user input or automatically generated when a preset condition is satisfied.

Here, the user input may include, for example, an input applied to a hard key/soft key/touch screen provided in the robot cleaner, a voice input, an input through an external device, and the like.

In addition, the preset condition may be associated with a specific position, a specific time or time zone, and communication with a fixed device. For example, when the robot cleaner 100 comes to a fixed specific position while cleaning a cleaning area based on a map (e.g., an obstacle map or a feature map), the preset input signal may be automatically generated. Furthermore, for example, when a cleaning command is input to the robot cleaner 100 at a specific time or time zone, both the input cleaning command and the preset input signal may be provided to the controller 1800.

When a preset input signal is sensed as described above, the controller 1800 of the robot cleaner 100 sets a start position based on a current position of the main body (S20).

Here, the start position may denote a cleaning start position in a predetermined area to be intensively cleaned by the robot cleaner.

The start position may be the same as or different from the current position of the robot cleaner.

When the current position of the robot cleaner 100 is determined as the start position, the controller 1800 of the robot cleaner 100 may control the main body to maintain a stationary state (i.e., a motionless state) at the current position for a predetermined period of time. Alternatively, the controller 1800 may perform alignment such that the front of the robot cleaner body faces a fixed orientation or the main and auxiliary wheels provided in the driving unit 1300 are arranged in parallel to each other.

When the start position is different from the current position of the robot cleaner 100, the controller 1800 of the robot cleaner 100 may control the driving unit 1800 so that the main body moves from the current position to the start position.

Next, the controller 1800 of the robot cleaner 100 may set a virtual boundary having a fixed size based on the determined start position, and then set a driving path having a preset pattern within the boundary (S20).

Here, the virtual boundary may be an edge of a predetermined area extending in all directions around the start position. In addition, the virtual boundary may denote an edge including the start position at any position within a predetermined area.

At this time, the start position and the virtual boundary may be recognized based on coordinate information acquired based on a map. Specifically, the controller of the robot cleaner acquires start coordinate information for the start position based on a map. Next, at least three or four pieces of x, y boundary coordinate information spaced apart in all directions or in a predetermined direction are additionally acquired based on the acquired starting coordinate information. The controller may recognize a virtual boundary set based on a map by connecting the four boundary coordinate information acquired as described above. Accordingly, in the present disclosure, an additional configuration (e.g., a signal transceiver) for continuously recognizing a start position or a virtual boundary is not required.

In addition, the predetermined area denotes a new cleaning area having a fixed size, that is, an area to be cleaned intensively. Therefore, the virtual boundary denotes an outer boundary of the new cleaning area. The controller of the robot cleaner 100 recognizes an inner side of the predetermined area as a cleaning area, and controls the robot cleaner body so as not to exit the virtual boundary.

Furthermore, a driving path in the new cleaning area is set differently from the existing one, and a driving path having a preset pattern is formed. In other words, a first type of driving path was previously automatically set for a cleaning area, but a second type of driving path, which is different from the first type, is now variably set. This is performed as one of a series of operations corresponding to a preset input signal in step S10.

Specifically, the driving path of the robot cleaner 100 is changed from a zigzag-type driving path and set to a spiral pattern driving path. The spiral pattern may be, for example, any one of a circular spiral pattern, a square spiral pattern, a triangular spiral pattern, and a zigzag spiral pattern.

Furthermore, a width of a line of the driving path having the preset pattern may be gradually increased or decreased.

Furthermore, when the driving path having the preset pattern satisfies a predetermined condition, the driving path may be temporarily modified to repeat a path that has passed a predetermined number of times. For example, when it is sensed that there is a large amount of dust on the current driving path, a varied driving path in which the robot cleaner goes back to a driving path that has passed in a reverse direction and returns to the current position may be repeated a predetermined number of times.

In this way, when a driving path having a preset pattern is set inside the virtual boundary, the controller of the robot cleaner controls the driving unit and the suction motor to perform a cleaning operation while driving on the set driving path in the first direction (S40).

Here, the first direction may be referred to as a direction gradually moving away from the start position. Furthermore, the first direction may be referred to as a direction gradually approaching the boundary while gradually moving away from the start position.

In one embodiment, the controller of the robot cleaner 100 may increase the suction power of the suction motor than before while driving on the driving path set in the first direction. Accordingly, it may be possible to increase the cleaning performance and the cleaning completion rate compared to before.

On the other hand, when the cleaning operation is completed while driving on the driving path set in the first direction, the controller of the robot cleaner now controls the driving unit and the suction motor to perform the cleaning operation while driving on the set driving path in a second direction opposite to the first direction (S50).

Here, the second direction has the same driving path as the first direction, but only has a changed direction. Therefore, the second direction may be referred to as a direction gradually moving closer to the start position. Furthermore, the second direction may be referred to as a direction gradually moving away from the boundary and gradually closer to the start position.

In one embodiment, the controller of the robot cleaner 100 may increase the suction power of the suction motor than before while driving on the driving path set in the second direction, but may decrease the suction power than when driving in the first direction. Furthermore, if necessary, the controller of the robot cleaner 100 may increase the suction power of the suction motor than before and when driving in the first direction while driving on the driving path set in the second direction. Accordingly, the efficiency of intensive cleaning can be maximized.

Furthermore, in one embodiment, the controller of the robot cleaner 100 may reduce the sensitivity level of a sensor such as a front sensor while driving on the driving path set in the second direction than when driving in the first direction. This is in consideration of driving on the same driving path. In other words, since an obstacle, the state of the floor, and the like have already been sensed once when driving in the first direction, the sensitivity level of the sensor is adjusted in consideration thereof when driving in the second direction.

When the robot cleaner drives on the driving path set in the first direction and reaches the start position, the cleaning operation is ended (S60). Therefore, even though the user does not intentionally end the cleaning operation, cleaning is automatically ended after intensive cleaning of a predetermined area, thereby providing user convenience.

However, in some cases, the cleaning operation may be ended before the robot cleaner reaches the initial start position. For example, when it is sensed that a moving obstacle exists at the initial start position or an input signal for ending intensive cleaning for a predetermined area according to the present disclosure is sensed, the cleaning operation may be ended. Accordingly, step S60 in FIG. 5 may be selectively performed.

As described above, the robot cleaner according to the present disclosure may intensively clean only a desired predetermined area, not the entire cleaning area displayed on the map. Accordingly, cleaning performance for a specific area can be improved and cleaning time can be reduced.

Hereinafter, each process of the flowchart in FIG. 5 will be described with a more specific example with reference to FIGS. 6A, 6B, 6C, and 6D.

Figure 6A:
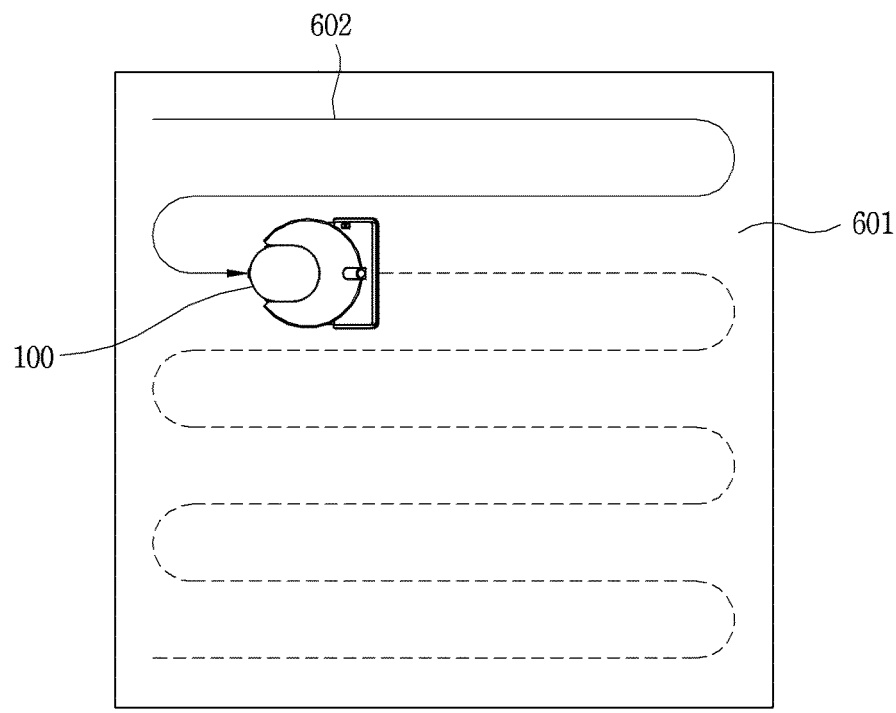
FIGS. 6A, 6B, 6C, and 6D are exemplary conceptual views for more specifically explaining each process of the flowchart in FIG. 5.

First, referring to FIG. 6A, a cleaning area 601 corresponding to a map of the robot cleaner 100 according to the present disclosure is cleaned while driving on a zigzag-type driving path 602.

At this time, when a preset input signal is received by the robot cleaner 100, cleaning is stopped and its current position (i.e., current coordinates) is recognized on a map.

When a preset input signal is sensed while performing the cleaning operation as described above, the controller of the robot cleaner 100 ends the currently performed cleaning mode, for example, the zigzag driving cleaning mode, and enters an intensive cleaning mode.

When entering the intensive cleaning mode is sensed, the above-described virtual boundary 610 is set, and an inner side of the set boundary is designated as a new cleaning area, that is, the intensive cleaning area.

In an embodiment, as the operation mode of the robot cleaner 100 is changed from a zigzag driving cleaning mode to an intensive cleaning mode, a preset feedback signal (e.g., a preset sound, voice, LED signal, etc.) may be output.

At this time, the virtual boundary 610 is determined based on the start position of the intensive cleaning mode. In addition, the start position may correspond to a position P of the robot cleaner 100 recognized at a time point when a preset input signal is sensed, as illustrated in FIG. 6B.

The intensive cleaning area is formed by the virtual boundary 610. The intensive cleaning area may be, for example, an area extended by a predetermined distance, for example, 1.8 to 2.0 m in vertical and horizontal directions based on the position P of the robot cleaner 100.

For the intensive cleaning area formed by the virtual boundary 610, a driving path 620 different from the previous zigzag driving path 602 is set.

Figure 6B:
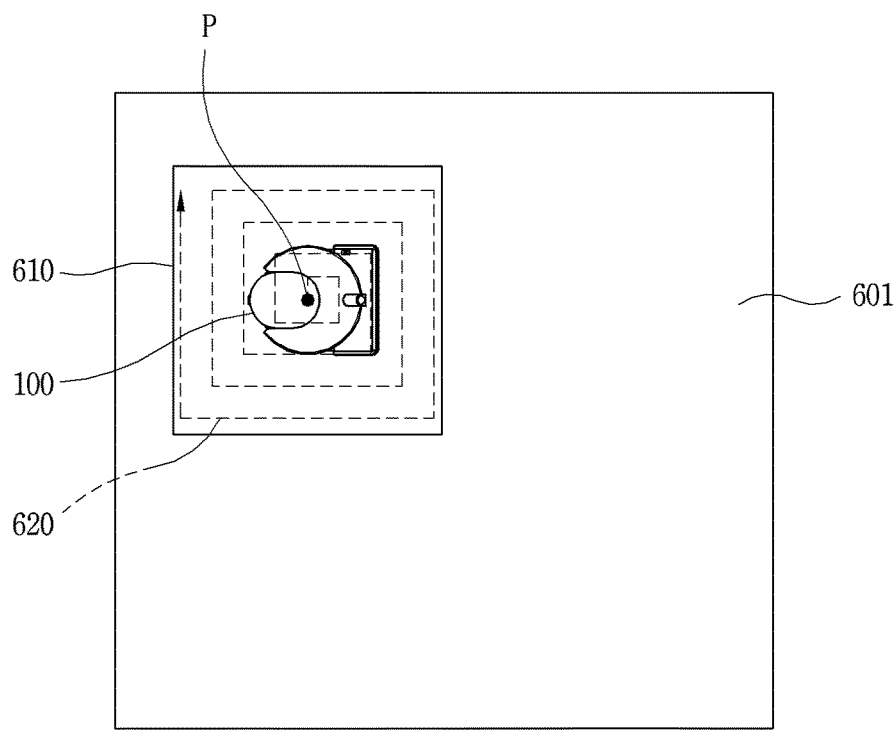

The different driving path 620 may be a driving path having a square spiral pattern as illustrated in FIG. 6B. However, it is not limited to this example, and may be implemented by being modified into a driving path of a circular spiral pattern, a driving path of a triangular spiral pattern, and a driving path of a zigzag spiral pattern.

On the other hand, the robot cleaner 100 may maintain a driving stop state at a current position P until the intensive cleaning area is determined by the virtual boundary 610 and a driving path having a square spiral pattern is calculated therein. However, when a preset input signal is sensed during a cleaning operation as shown in FIG. 6A, the operation of the suction motor is maintained in the driving stop state.

When the preset input signal is sensed, the controller of the robot cleaner 100 controls the suction motor to increase the suction power of the main body than before. Specifically, when the virtual boundary and the driving path are calculated, the robot cleaner moves from the current position or to the start position, and then changes the suction power of the robot cleaner 100 to "high".

Then, the controller of the robot cleaner 100 controls the driving unit to move the main body based on the driving path 620 formed in the intensive cleaning area as described above. The driving and cleaning operations on the driving path 620 are performed at least twice in different directions.

Figure 6C:
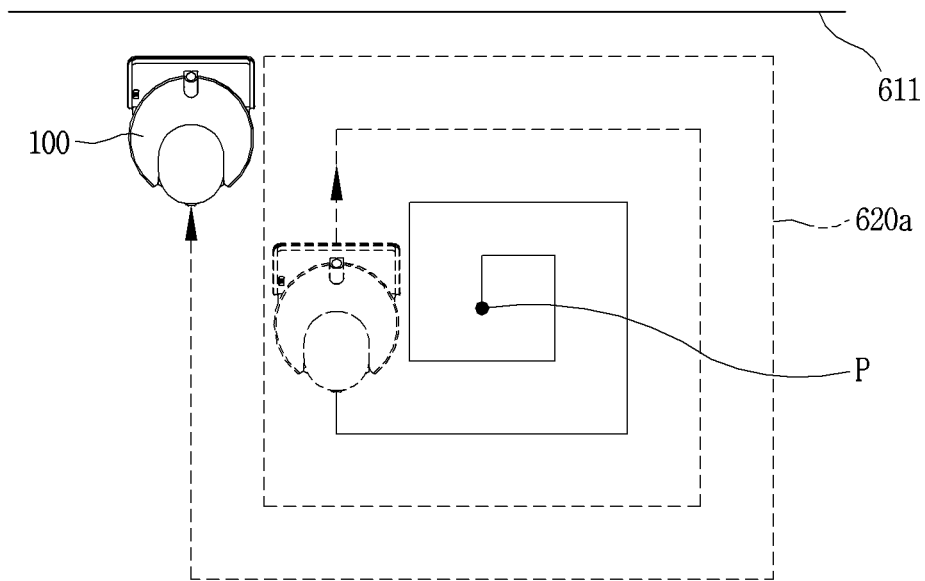
Figure 6D:
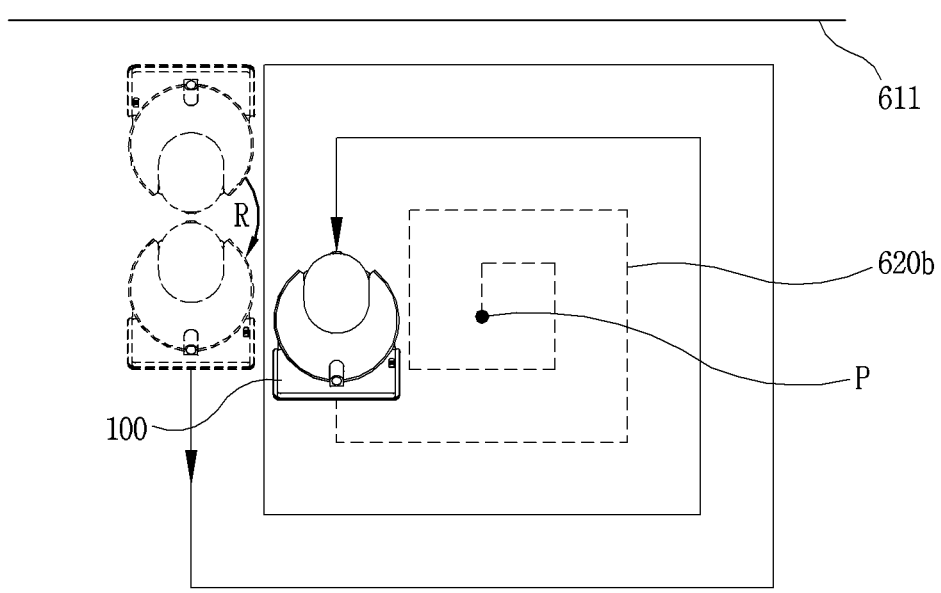

For example, as illustrated in FIGS. 6C and 6D, the driving in the first direction may be a square spiral driving in which the robot cleaner body gradually moves away from the start position. Furthermore, the driving in the second direction may be a square spiral driving in which the robot cleaner body gradually moves closer to the start position.

FIG. 6C shows a "first" driving and cleaning operation for the set driving path 620.

When the driving path 620 is set in the intensive cleaning area, the robot cleaner 100 moves along the set driving path 620 with the current position P as the start position to perform a cleaning operation.

In the "first" driving and cleaning operation, the main body is controlled to move on a driving path 620a in the first direction, for example, a driving path in a direction gradually moving away from the starting position P while moving gradually closer to the boundary line 611.

Since the driving path 620a is a driving path having an "expanded" square spiral pattern, the square is initially small, and the driving direction is frequently changed. In addition, since the square of the driving path 620a increases as gradually moving away from the start position P, the driving direction is also infrequently changed.

On the set driving path 620, the driving direction is always changed to the right by 90 degrees with respect to a front side of the robot cleaner body. The controller of the robot cleaner 100 may control the driving speed to decrease and the suction power of the suction motor to increase at a time point when the driving direction is changed. In this way, the suction power of dust may be further increased at the point where the driving direction is changed, thereby increasing cleaning performance to be suitable for the intensive cleaning mode.

When the position of the robot cleaner reaches an end of the set driving path 620 and approaches the boundary line 611, the "first" driving and cleaning operation is ended. Then, the controller of the robot cleaner 100 rotates in place by 180 degrees in a direction toward the start position P, and then prepares for a second driving and cleaning operation.

FIG. 6D shows a "second" driving and cleaning operation for the set driving path 620.

The start position of the "second" driving and cleaning operation is a position rotated in place by 180 degrees from an end point of the "first" driving and cleaning operation.

In the "second" driving and cleaning operation, the main body is controlled to move along a driving path 620b in the second direction, for example, a driving path in a direction in which the robot cleaner 100 gradually moves away from the current position while gradually moving closer to the initial start position P.

The driving path 620b is the same path as the initial driving path 620a, but only has an opposite direction. However, in another embodiment, in order to perform more thorough cleaning, the driving path 620b may be set by slightly shifting a driving line of the initial driving path 620a. In other words, the driving path 620b may be formed between two driving lines of the initial driving path 620a.

Since the driving path 620b is a driving path having a "reduced" square spiral pattern, the square of the driving path 620a is initially large, and the driving direction is infrequently changed. In addition, since the square of the driving path 620b decreases as gradually moving closer to the start position P, the driving direction is more frequently changed.

In the driving path 620b, the driving direction is always changed to the left by 90 degrees with respect to the front of the robot cleaner body.

The controller of the robot cleaner 100 may control the suction power of the suction motor to increase while decreasing the driving speed at each time point when the driving direction is changed. In this way, the suction power of dust may be further increased at the point where the driving direction is changed, thereby increasing cleaning performance to be suitable for the intensive cleaning mode.

In addition, in an embodiment, the cleaning operation may be performed by varying at least one of a driving speed, suction power, and a sensitivity level of a sensor during first driving and second driving on a set driving path.

For example, while driving on the second driving path 620*b*, it may be possible to drive with a faster driving speed and slightly reduced suction power than the initial driving path 620*a*. In addition, for example, while driving on the second driving path 620*b*, setting information may be changed to decrease the sensitivity level of a sensor that senses an obstacle compared to the initial driving path 620*a*.

On the other hand, when the position of the robot cleaner reaches an end of the driving path 620*b* or the start position P, the "second" driving and cleaning operation is ended. The controller of the robot cleaner 100 may output a preset feedback signal and then operate to end an intensive cleaning mode.

Then, the robot cleaner may perform either one of the following two operations.

For example, as illustrated in FIG. 6A, a zigzag driving and cleaning operation may be performed on the entire cleaning area again. In other words, the intensive cleaning mode may be switched to a zigzag driving cleaning mode. Accordingly, the robot cleaner 100 may continue to perform a driving and cleaning operation outside the boundary 610 to exit the current position.

At this time, in addition to the driving path of the robot cleaner 100, the driving speed, the suction power, and the sensitivity level of the sensor are automatically restored to the original states.

For another example, after a predetermined period of time has elapsed, the power of the robot cleaner 100 may be turned off to move the main body to return to a designated position (e.g., a charging station). However, when a preset input signal is sensed within a predetermined period of time, the above process described with reference to FIGS. 6B to 6D may be repeated again.

On the other hand, in the above, when the intensive cleaning mode is performed, the same driving path is repeated twice with different directions, but a predetermined area may be intensively cleaned while increasing the number of repetitions to three or more or changing the driving path.

Hereinafter, with reference to FIGS. 7, 8A, and 8B, a method of avoiding an obstacle while the robot cleaner intensively cleans a predetermined area will be described in detail.

Figure 7:
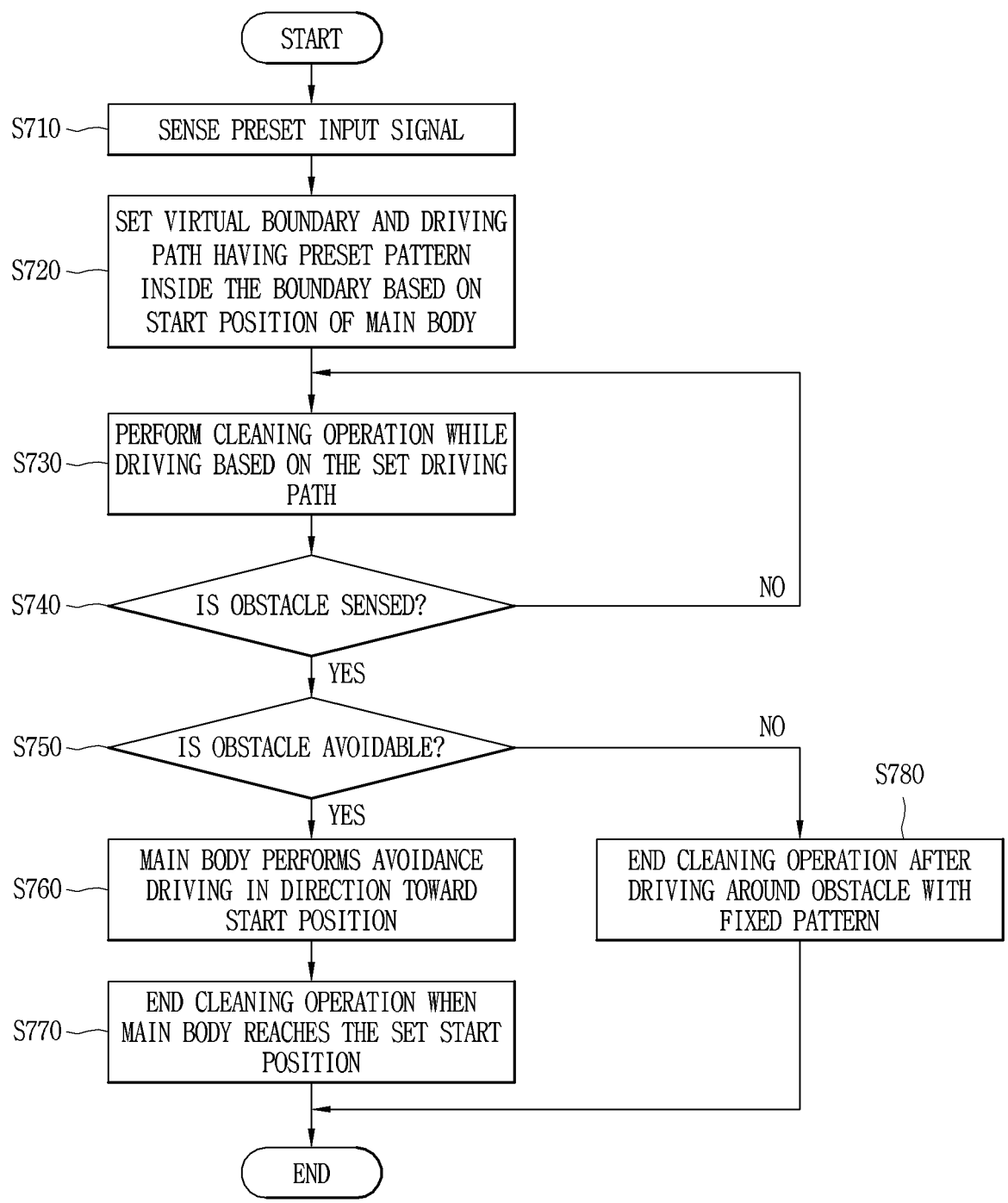
FIGS. 7, 8A, 8B, and 8C are a flowchart and conceptual views for explaining a method of avoiding an obstacle while intensively cleaning a predetermined area by a robot cleaner according to an embodiment of the present disclosure.

First, referring to FIG. 7, the robot cleaner 100 senses a preset input signal (S710).

Accordingly, the controller of the robot cleaner 100 senses that it has entered an intensive cleaning mode. Specifically, when the robot cleaner 100 is already operating in another cleaning mode, it switches to the intensive cleaning mode. In addition, when the robot cleaner 100 is in a power-off state, a power-on signal and an intensive cleaning mode start signal are transmitted together to the controller of the robot cleaner 100 to operate the main body in the intensive cleaning mode from the beginning.

Next, the robot cleaner 100 sets a virtual boundary and a driving path having a preset pattern inside the boundary based on the start position of the main body (S720). Then, the robot cleaner 100 drives based on the set driving path to perform a cleaning operation (S730).

Meanwhile, when an obstacle is sensed during the cleaning operation (S740), the controller of the robot cleaner 100 determines whether the sensed obstacle can be avoided (S750). To this end, the controller of the robot cleaner 100 may determine the position and size of the obstacle, and whether or not it is possible to perform avoidance driving based on a sensor value acquired through a front sensor, a 3D sensor, and the like.

When it is an avoidable obstacle, the robot cleaner 100 performs avoidance driving toward the start position (S760). Accordingly, the intensive cleaning performance is improved even during an avoidance operation against an obstacle.

The controller of the robot cleaner 100 may control the driving speed of the main body to decrease by a predetermined value while performing avoidance driving. Then, when the robot cleaner completely avoids the obstacle to enter into the set driving path, it recovers the driving speed of the main body to drive again.

Furthermore, in one example, the controller of the robot cleaner may control the driving of the suction motor to decrease the suction power of the main body by a predetermined value while performing avoidance driving. This is to prevent the robot cleaner from being a threat to an obstacle such as a baby or an animal because it is driven with high suction power while performing the intensive cleaning mode. When the robot cleaner completely avoids the obstacle to enter into the set driving path, it recovers the driving speed of the main body to drive again.

Figure 8A:
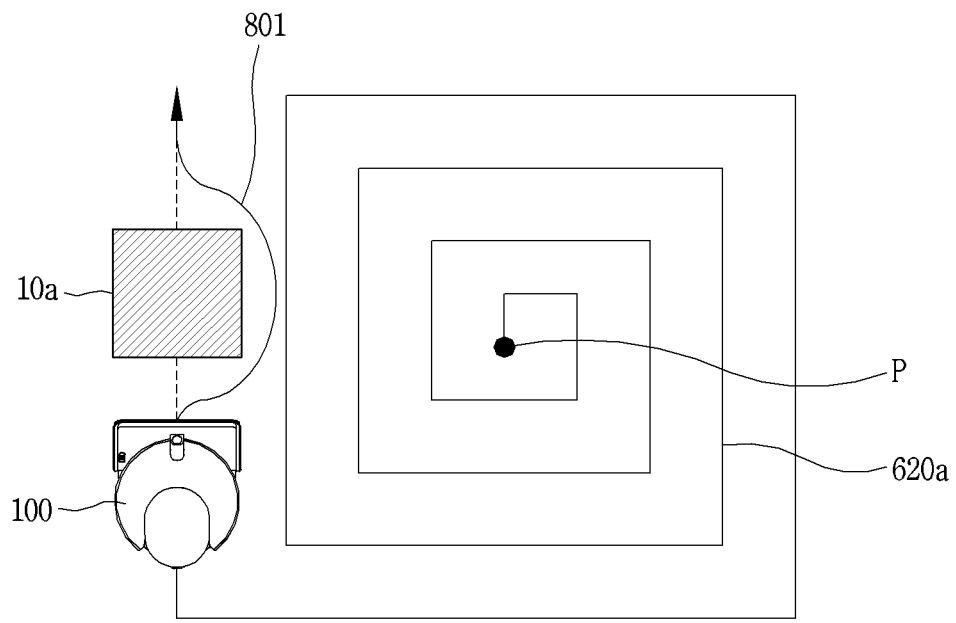

FIG. 8A is an operation in which the robot cleaner 100 encounters and avoids an obstacle 10*a* while driving in a first direction on a set driving path.

Specifically, when the robot cleaner 100 encounters an avoidable obstacle 10*a* while driving in the first direction on the set driving path, that is, while driving on an extended square spiral driving path, the robot cleaner drives 801 by avoiding the obstacle 10*a* to the right. Accordingly, the robot cleaner 100 draws a driving path for avoiding the obstacle 10*a* in the direction toward the start position P. After completely avoiding the obstacle 10*a*, it drives according to the set driving path again.

Figure 8B:
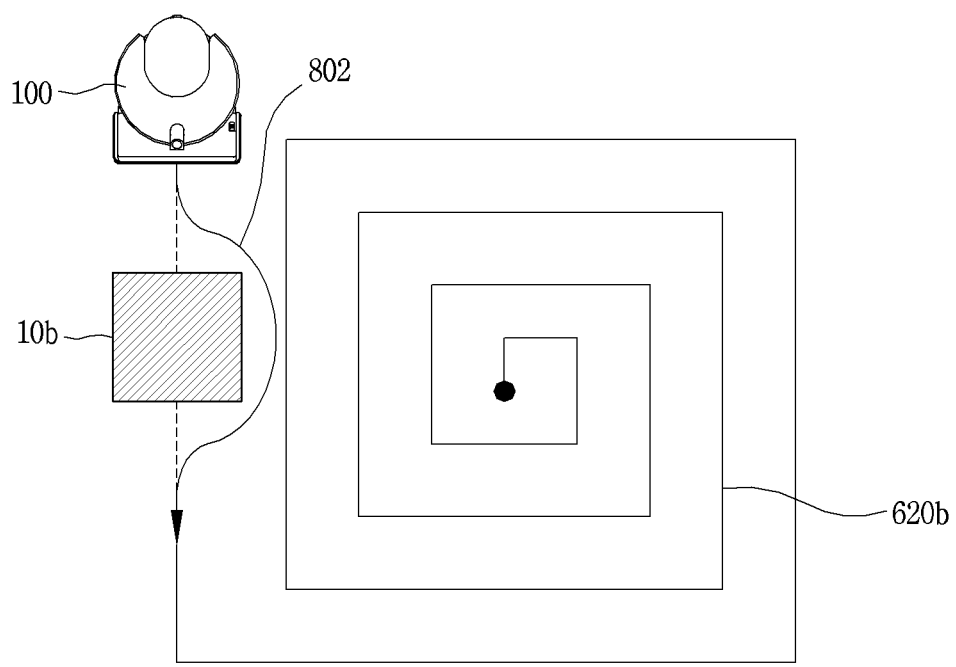

FIG. 8B is an operation in which the robot cleaner 100 encounters and avoids an obstacle 10*b* while driving in a second direction on a set driving path.

Specifically, when the robot cleaner 100 encounters an avoidable obstacle 10*b* while driving in the second direction on the set driving path, that is, while driving on a reduced square spiral driving path, the robot cleaner drives 802 by avoiding the obstacle 10*b* to the left. Accordingly, the robot cleaner 100 draws a driving path to avoid the obstacle 10*b* in a direction toward the start position P. After avoiding the obstacle (10*b*), it drives according to the set driving path again.

In one example, when the start position is located at an arbitrary point in the intensive cleaning area unlike FIGS. 8A and 8B located at the center of the intensive cleaning area, the robot cleaner may operate to draw a driving path avoiding the obstacle 10*b* in a direction toward the center of the intensive cleaning area. Accordingly, during the avoidance operation of the obstacle 10*b*, the robot cleaner may avoid the obstacle 10*b* without exiting the set boundary.

After performing such an avoidance operation, when the main body of the robot cleaner 100 reaches the initial start position, the cleaning operation is ended (S770). In other words, the intensive cleaning mode is canceled.

Then, the controller of the robot cleaner 100 may wait at the start position, switch to a previous cleaning mode to perform a cleaning operation, or move to a position of a charging station to perform charging.

On the other hand, when it is an unavoidable obstacle, the controller of the robot cleaner 100 ends the cleaning operation after driving around the sensed obstacle in a fixed pattern (S780).

Figure 8C:
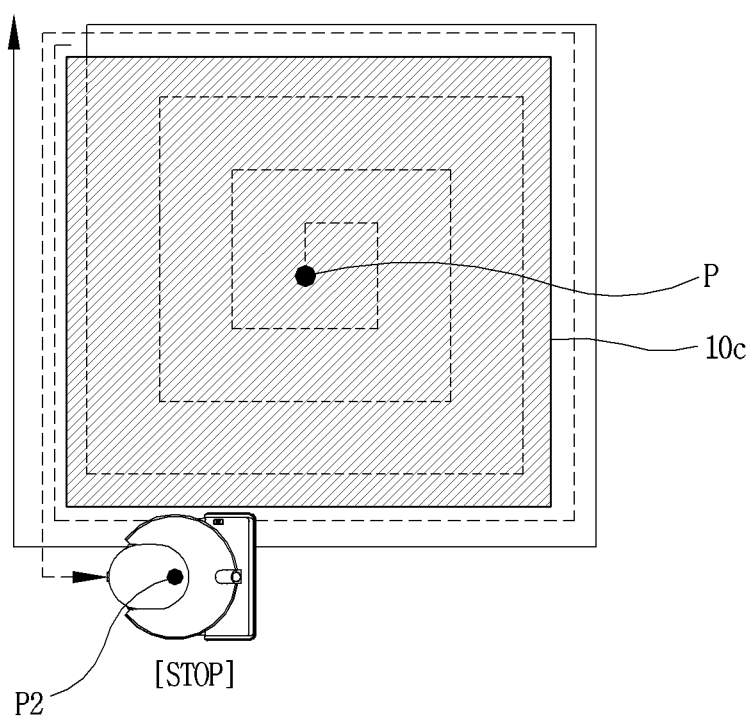

Specifically, as illustrated in FIG. 8c, when the obstacle 10c has an obstacle at the start position P, the robot cleaner 100 confirms not to go to the start position P while rotating 1 to 1.5 turns around the obstacle 10c. Accordingly, the start position is changed to a second point P2, and the robot cleaner stops driving to end cleaning when it is sensed that the second point P2 has been reached.

Alternatively, although not shown, in another example, when the obstacle 10c has an obstacle at the start position P, the setting may also be changed to end the intensive cleaning mode and switch to the zigzag driving cleaning mode to clean the entire cleaning area of the map.

On the other hand, at the beginning of the intensive cleaning mode, the robot cleaner may encounter an unavoidable obstacle. In other words, in FIG. 8C, when the robot cleaner 100 is unable to go to the start position P from the beginning, the second point P2 is reset to the start position, and the virtual boundary and the driving path of the preset pattern must be set again based on the second point P2.

Figure 9:
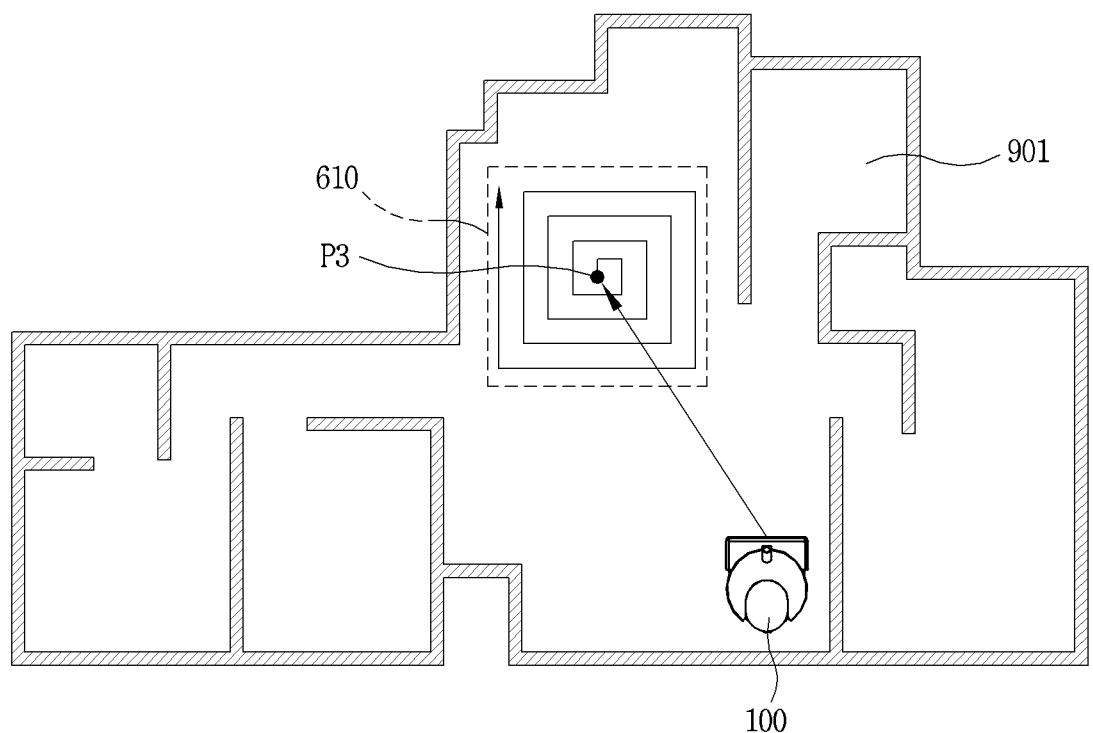
FIG. 9 is an exemplary conceptual view showing a method of intensively cleaning an area spaced apart from a current position by a robot cleaner according to an embodiment of the present disclosure.

Hereinafter, FIG. 9 illustrates a modified example of step (S20) of setting a start position in response to a preset input signal in FIG. 5. In the following embodiment, still another example of setting a start position will be described in detail, but the remaining steps (S10, S30, S40, S50, S60) in FIG. 5 will be applied in the same manner.

If necessary, the robot cleaner 100 may set an area spaced apart from a current location as an intensive cleaning area.

Specifically, a user may point to a remote start position P3 using a remote control device (e.g., a terminal, a remote controller, etc.) (not shown) that communicates with the robot cleaner 100. Then, the remote control device recognizes the coordinate information of the pointed start position P3 using a sensor value acquired through an acceleration sensor, a gyro sensor, or an IMU sensor. The coordinate information of the start position P3 is directly transmitted to the robot cleaner 100 or displayed on a map 901, and thus the robot cleaner 100 may recognize the coordinate information of the start position P3 that is pointed based on its current position.

Alternatively, for another example, an area to be intensively cleaned may be selected using a terminal on which a map screen is displayed. For example, the user may apply a preset touch input to the map screen to select the start position P3 in FIG. 9. Then, the coordinate information of the selected position is calculated and transmitted to the robot cleaner 100, and the robot cleaner moves to the start position P3 corresponding to the received coordinate information.

To this end, the controller of the robot cleaner 100 first acquires distance information from the current position of the main body to a remote start position. Then, the main body is moved to the remote start position based on the acquired distance information.

One or more remote start positions P3 may be set. When a plurality of remote start positions P3 are set, the controller of the robot cleaner 100 stores all coordinate information for the set plurality of start positions. Then, the robot cleaner 100 moves from the current position to the nearest starting position to clean a first intensive cleaning area. When the cleaning of the first intensive cleaning area is completed, the robot cleaner moves to a next start position close to the position of the robot cleaner at that time point to clean a second intensive cleaning area.

Meanwhile, the intensive cleaning mode may be temporarily canceled while moving to the start position of the second intensive cleaning region subsequent to the completion of the first intensive cleaning area. Accordingly, the driving speed, suction power, and sensitivity level of the sensor in the robot cleaner return to a normal cleaning mode (e.g., a zigzag driving cleaning mode).

Figure 10A:
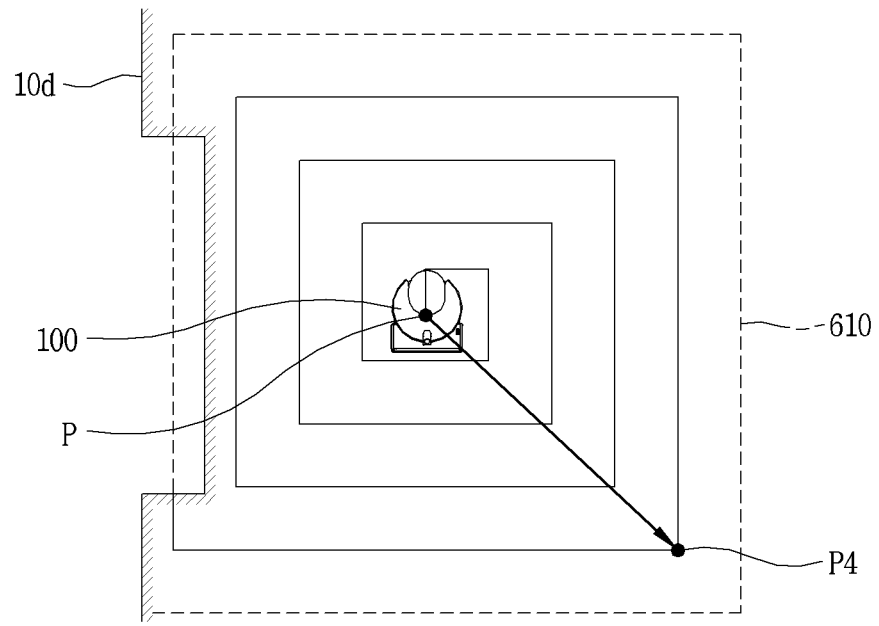
FIGS. 10A, 10B, and 10C are exemplary conceptual views showing a method of intensively cleaning a narrow space by a robot cleaner according to an embodiment of the present disclosure.
Figure 10B:
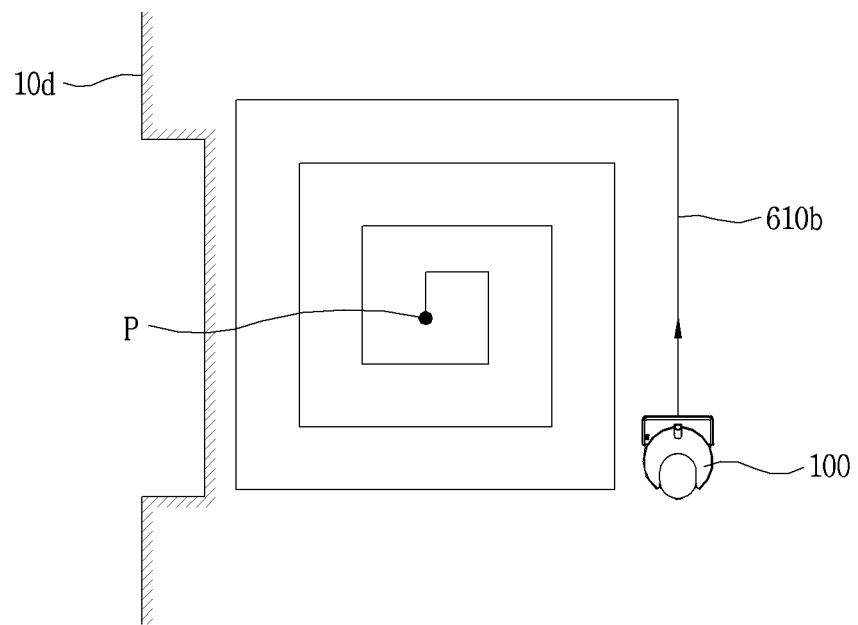
Figure 10C:
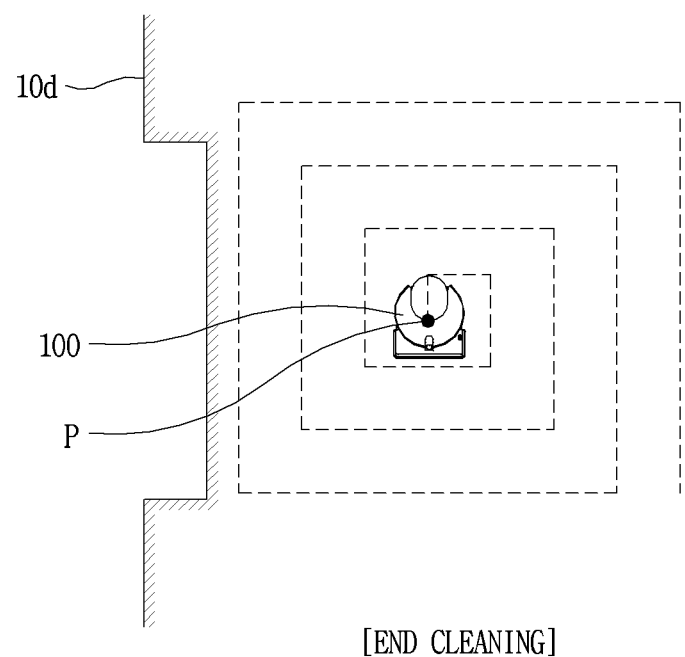

In still another embodiment, hereinafter, FIGS. 10A to 10C are views illustrating a modified example of the steps (S20, S30) of setting a start position in response to a preset input signal in FIG. 5 and setting a virtual boundary and a driving path having a preset pattern. The remaining steps (S10, S50, S60) except for part (e.g., S40) of the other steps in FIG. 5 may be applied in the same manner.

First, when a preset input signal is sensed, the robot cleaner 100 recognizes that the intensive cleaning area cannot be set to a fixed size due to an unavoidable obstacle 10d such as a wall, as illustrated in FIG. 10A. Then, the robot cleaner 100 sets the intensive cleaning area to a reduced size.

For example, when a length of one side of the intensive cleaning area having a fixed size is 3.6 m, a length of one side of the intensive cleaning area 610b with a reduced size is set to less than 3.6 m. In addition, a corner point of the intensive cleaning area 610b with the reduced size is determined as a start position P4. Then, a reduced square spiral driving path gradually moving from the determined start position P4 to the current position P of the robot cleaner is generated.

Next, the robot cleaner 100 stores the current position P and then moves to the start position P4. Then, at the start position P4, the intensive cleaning operation is performed while driving on the reduced square spiral driving path. In other words, the driving and cleaning process (S40) in the first direction in FIG. 5 is skipped, and only the driving and cleaning process (S50) in the second direction is performed.

In this way, when the cleaning operation is performed on the intensive cleaning area 610b with the reduced size, the set driving path may be driven and cleaned only once to operate the robot cleaner 100 with higher suction power and/or a slower driving speed than a normal intensive cleaning mode.

Furthermore, in an embodiment, while driving on a driving path adjacent to an obstacle 10d, the robot cleaner 100 may meticulously perform a cleaning operation to the right by 90 degrees such that a suction nozzle rotates to the right by 90 degrees to face the obstacle 10d. In other words, at this time, the robot cleaner 100 operates so that there is no suction blind spot while making contact with an obstacle several times without avoiding the obstacle. Alternatively, in another example, while driving on the driving path adjacent to the obstacle 10d, the robot cleaner 100 may perform a cleaning operation at a lower driving speed and a stronger suction force.

In this way, when the robot cleaner encounters an avoidable obstacle while performing a cleaning operation in a square spiral driving that moves gradually closer to the stored position P from the start position P4, an avoidance operation is performed in a direction toward the stored position P. Then, when the robot cleaner reaches the stored position (P), the cleaning operation is ended.

As described above, according to a robot cleaner and a control method thereof in accordance with an embodiment of the present disclosure, it may be possible to reduce a driving speed and increase suction power, thereby intensively and quickly cleaning a partial area, which is not an entire cleaning area on a map. Furthermore, even though a user does not intentionally end intensive cleaning, cleaning may be automatically ended after intensively cleaning in a predetermined area, thereby providing user convenience. In addition, an avoidance operation against an obstacle sensed during intensive cleaning may move toward an inside of an intensive cleaning area, thereby improving intensive cleaning performance.

The present disclosure described above may be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 1800. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. A robot cleaner, comprising:
a main body provided with a suction motor that generates suction power;
a sensor that senses an obstacle existing in front of the main body,
a driving unit that moves the main body; and
a controller that recognizes a position of the main body in a cleaning area in response to sensing a preset input signal, and determining a start position based on the recognized position,
wherein the controller sets a virtual boundary having a fixed size based on the determined start position, and sets a driving path having a preset pattern within the boundary, and controls the driving unit and the suction motor to perform a cleaning operation while driving on the driving path in a first direction and then to perform a cleaning operation while driving on the driving path in a second direction opposite to the first direction, and
wherein the controller controls the driving unit to move the main body by avoiding the obstacle in a direction toward the start position in response to sensing the obstacle through the sensor while the main body drives on the driving path in the first direction or the second direction.

2. The robot cleaner of claim 1, wherein the controller ends a cleaning operation when the main body drives on the driving path in the second direction to reach the start position.

3. The robot cleaner of claim 1, wherein the controller controls the driving unit to end a cleaning mode of the main body that is currently being performed in response to sensing the preset signal while performing the cleaning operation and to move the main body based on the set driving path.

4. The robot cleaner of claim 1, wherein the controller designates an inner area of the boundary as a cleaning area, and controls the driving unit so as not to exit the boundary while the main body moves in the inner area.

5. The robot cleaner of claim 1, wherein driving in the first direction is a square spiral driving in which the main body gradually moves away from the start position, and
driving in the second direction is a square spiral driving in which the main body gradually moves closer to the start position.

6. The robot cleaner of claim 1, wherein the controller controls the driving unit to change the direction by rotating in place in a direction facing the start position after the main body completes the driving of the driving path in the first direction.

7. The robot cleaner of claim 1, wherein the controller controls the suction motor to increase the suction power than before when the preset input signal is sensed.

8. The method of claim 7, wherein the controller controls the suction motor to generate first suction power while the main body drives on the driving path in the first direction, and generate second suction power different from the first suction power while the main body drives on the driving path in the second direction.

9. The robot cleaner of claim 1, wherein when it is determined that the main body is unable to move by avoiding the sensed obstacle, the controller ends a cleaning operation after driving around the sensed obstacle in a predetermined pattern.

10. The robot cleaner of claim 1, wherein when the start position is set to a position spaced apart from the main body, the controller acquires distance information from the recognized position to the start position, and controls the driving unit to move the main body to the start position based on the acquired distance information.

11. The robot cleaner of claim 1, wherein when the virtual boundary is set to less than a fixed size, the controller sets a first point adjacent to the boundary as the start position, and
the main body performs a cleaning operation while skipping driving in the first direction and driving only in the second direction in response to moving the main body to the first point.

12. The robot cleaner of claim 11, wherein the controller performs a cleaning operation in a square spiral driving gradually closer to the recognized position from the first point in response to moving the main body to the first point, and ends the cleaning operation when the main body reaches the recognized position.

* * * * *